United States Patent
Yu et al.

(10) Patent No.: US 8,284,532 B2
(45) Date of Patent: Oct. 9, 2012

(54) OVER-VOLTAGE PROTECTION SYSTEM AND ELECTRONIC DEVICE USING THE SAME

(75) Inventors: Lei Yu, Shenzhen (CN); Ping-Hua Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 396 days.

(21) Appl. No.: 12/772,926

(22) Filed: May 3, 2010

(65) Prior Publication Data

US 2011/0216460 A1 Sep. 8, 2011

(30) Foreign Application Priority Data

Mar. 2, 2010 (CN) ...................... 2010 2 0121592 U

(51) Int. Cl.
*H02H 3/20* (2006.01)
*H02H 9/04* (2006.01)

(52) U.S. Cl. ...................................................... 361/91.1
(58) Field of Classification Search ................... 361/91.1
See application file for complete search history.

(56) References Cited

U.S. PATENT DOCUMENTS

| | | | | |
|---|---|---|---|---|
| 5,570,004 A | * | 10/1996 | Shibata | ........................ 323/303 |
| 5,789,902 A | * | 8/1998 | Abe et al. | ....................... 320/134 |
| 6,118,253 A | * | 9/2000 | Mukainakano et al. | ...... 320/134 |
| 6,781,806 B2 | * | 8/2004 | Hashimoto et al. | .......... 361/91.1 |
| 7,667,435 B2 | * | 2/2010 | Denning | ........................ 320/132 |
| 7,924,540 B2 | * | 4/2011 | Tamegai | ....................... 361/91.5 |
| 2003/0218844 A1 | * | 11/2003 | Broulim et al. | .............. 361/91.1 |
| 2008/0266739 A1 | * | 10/2008 | Migliavacca | ................ 361/91.1 |

* cited by examiner

*Primary Examiner* — Rexford Barnie
*Assistant Examiner* — Christopher Clark
(74) *Attorney, Agent, or Firm* — Altis Law Group, Inc.

(57) ABSTRACT

An over-voltage protection system is connected between a power supply and two working circuits of an electronic device, and includes a first over-voltage protection circuit, a second over-voltage protection circuit, and a voltage load circuit. The over-voltage protection system detects voltage of the power supply, isolates the power supply from a first working circuit when the power supply exceeds a first predetermined voltage value, and isolates the power supply from a second working circuit when the voltage of the power supply exceeds a second predetermined voltage value and is lower than the first predetermined voltage value. The voltage load circuit bears partial voltage of the power supply to provide necessary power to the second working circuit when the voltage of the power supply exceeds a second predetermined voltage value and is lower than the first predetermined voltage value.

12 Claims, 2 Drawing Sheets

OVER-VOLTAGE PROTECTION SYSTEM AND ELECTRONIC DEVICE USING THE SAME

BACKGROUND

1. Technical Field

The disclosure relates to electronic devices, and particularly to an electronic device with over-voltage protection.

2. Description of Related Art

Theoretical values and actual values of electronic component parameters can differ due to dispersion of parameters of electronic component. For example, trigger voltages for over-voltage protection circuits can vary within a range. Commonly, only one over-voltage protection circuit is deployed in an electronic device, corresponding to one trigger voltage range. However, a plurality of voltage outputs are utilized in an electronic device, with different voltage tolerance ranges, so a single over-voltage protection circuit cannot always provide effective protection.

DETAILED DESCRIPTION

Figure 1:
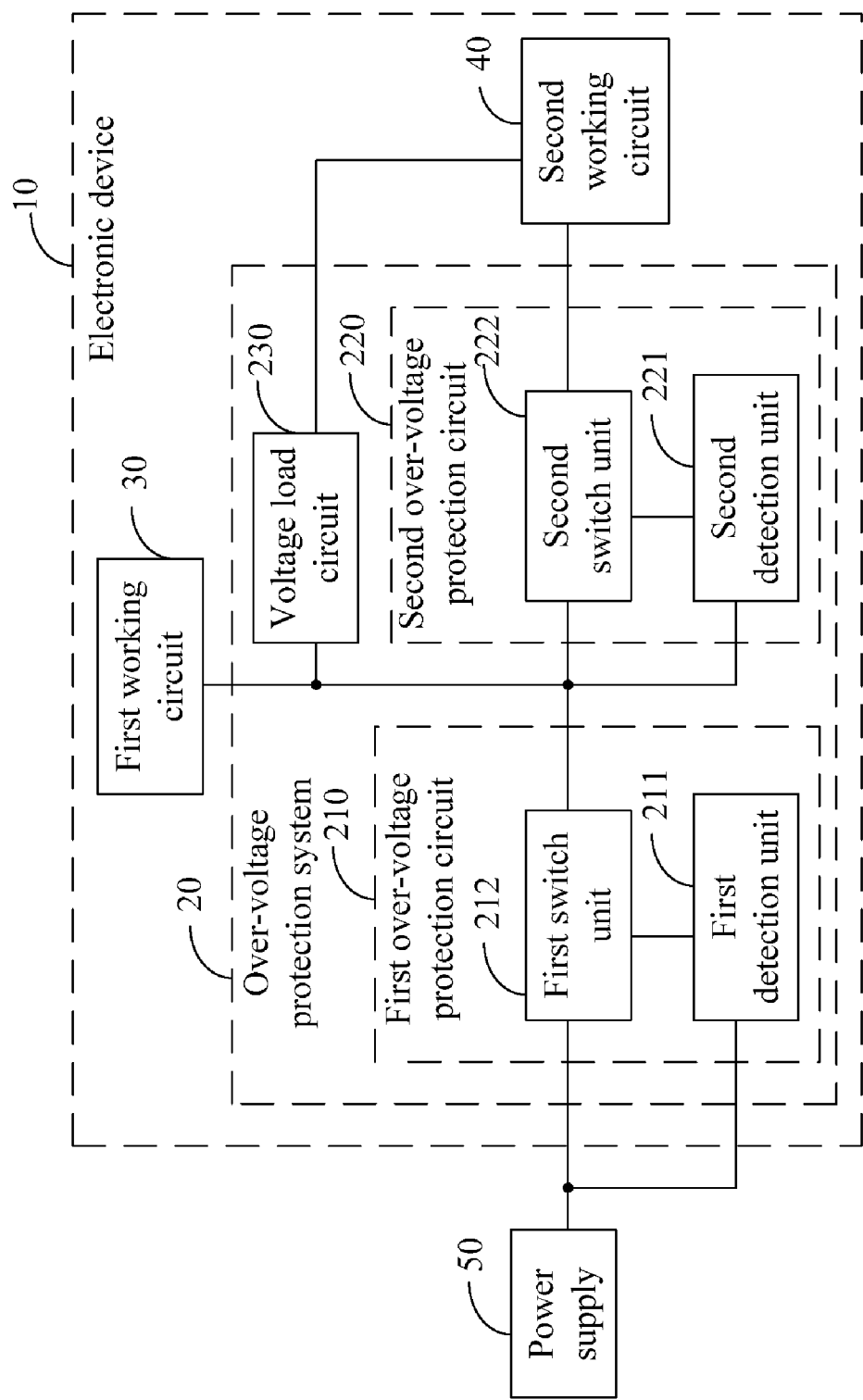
FIG. 1 is a schematic diagram of an embodiment of an electronic device as disclosed.

FIG. 1 is a schematic diagram of an embodiment of an electronic device 10 as disclosed. The electronic device 10 is powered by a power supply 50, and includes an over-voltage protection system 20, a first working circuit 30, and a second working circuit 40. In one embodiment, the power supply 50 may be an external power supply. In alternative embodiments, the power supply 50 may alternatively be an internal power supply. The electronic device 10 may be a communication device, such as, a router, a modem, or a set top box, for example. The first working circuit 30 and the second working circuit 40 enable operation of the electronic device 10. For example, the first working circuit 30 may be a motherboard, and the second working circuit 40 may be a hard disk.

The over-voltage protection system 20 connects between the power supply 50 and the two working circuits 30, 40, isolating the two working circuits 30, 40 from the power supply 50 to provide over-voltage protection to the two working circuits 30, 40.

It should be understood that maximum voltage values for the first working circuit 30 and the second working circuit 40 are the same in theory. However, due to dispersion of parameters, differences occur between the maximum voltage values of the first working circuit 30 and the second working circuit 40. The maximum voltage value of the first working circuit 30 is defined as a first predetermined voltage value, and the maximum voltage value of the second working circuit 40 as a second predetermined voltage value that is lower than the first predetermined voltage value. For example, while the maximum voltage values of the first working circuit 30 and the second working circuit 40 may be both intended to be 12V, actual maximum voltage value of the first working circuit 30, the first predetermined voltage value, can reach about 14.1V, for example. An actual maximum voltage value, the second predetermined voltage value of the second working circuit 40, can reach about 13.2V, for example.

If an input voltage of the first working circuit 30 exceeds the first predetermined voltage value, that is, the maximum voltage value of the first working circuit 30, the over-voltage protection system 20 is required to protect the first working circuit 30.

If an input voltage of the second working circuit 40 exceeds the second predetermined voltage value, that is, the maximum voltage value of the second working circuit 40, the over-voltage protection system 20 is required to protect the second working circuit 40.

In one embodiment, the over-voltage protection system 20 includes a first over-voltage protection circuit 210, a second over-voltage protection circuit 220, and a voltage load circuit 230. The first over-voltage protection circuit 210 is connected between the power supply 50 and the first working circuit 30, isolating the first working circuit 30 from the power supply 50 when an input voltage of the first working circuit 30 exceeds the first predetermined voltage value. The first over-voltage protection circuit 210 includes a first detection unit 211 and a first switch unit 212. The first switch unit 212 is connected between the power supply 50 and the first working circuit 30. The first detection unit 211 detects voltage of the power supply 50, and turns off the first switch unit 212 to isolate the first working circuit 30 from the power supply 50 when the voltage of the power supply 50 exceeds the first predetermined voltage value.

The second over-voltage protection circuit 220 is connected between the first over-voltage protection circuit 210 and the second working circuit 40, isolating the second working circuit 40 from the power supply 50 when an input voltage of the second working circuit 40 exceeds the second predetermined voltage value. The second over-voltage protection circuit 220 includes a second detection unit 221 and a second switch unit 222. The second switch unit 222 is connected between the first over-voltage protection circuit 210 and the second working circuit 40. The second detection unit 221 detects the voltage of the power supply 50, and turns off the second switch unit 222 to isolate the power supply 50 from the second working circuit 40 when the voltage of the power supply 50 exceeds the second predetermined voltage value and is lower than the first predetermined voltage value.

The voltage load circuit 230 is connected to the second over-voltage protection circuit 220 in parallel, and bears partial voltage of the power supply 50, that is, receives a portion of the voltage of the power supply 50, to provide necessary power to the second working circuit 40 when the second switch unit 222 turns off.

Figure 2:
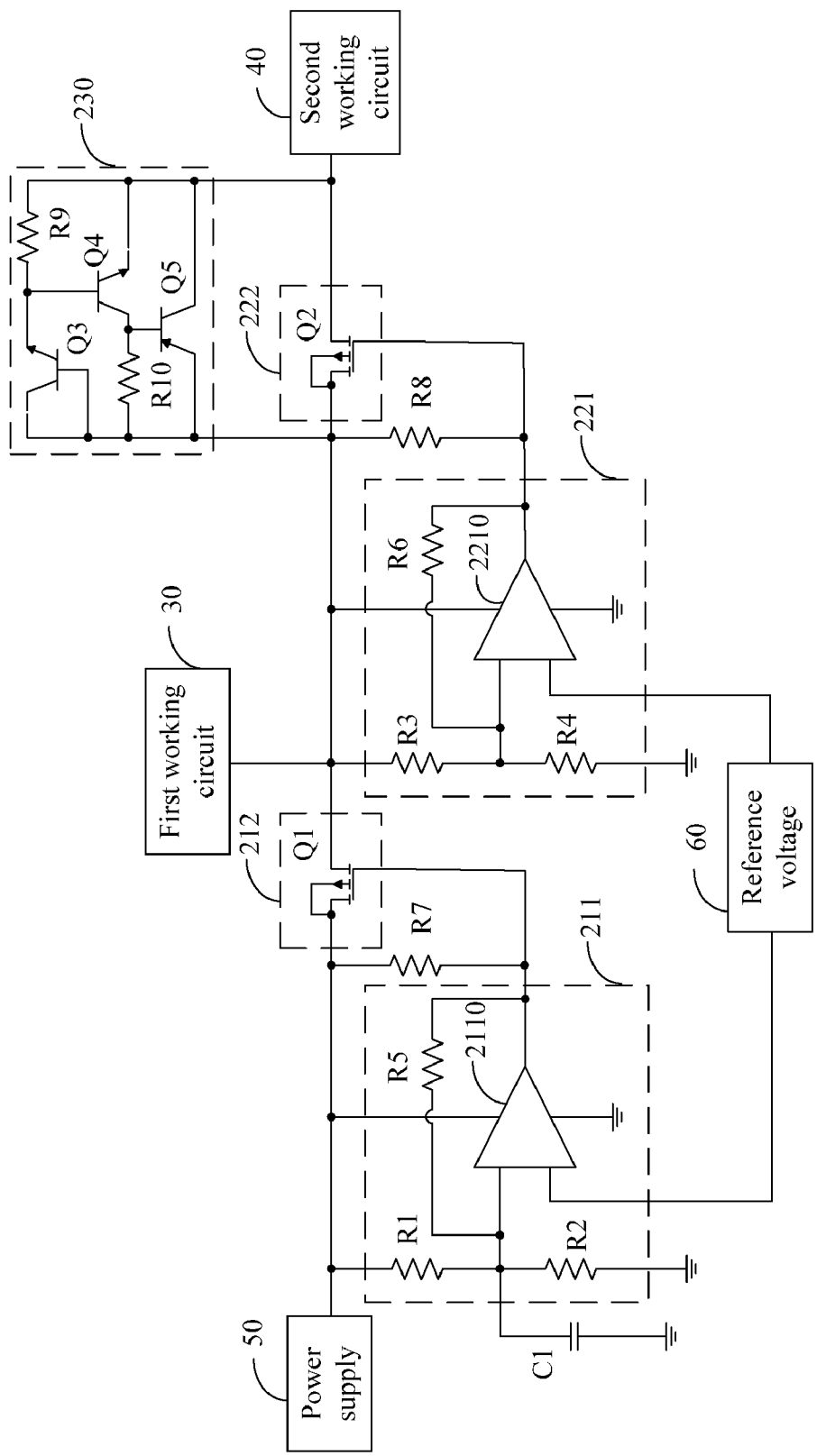
FIG. 2 is a circuit diagram of an embodiment of an over-voltage protection system as disclosed.

FIG. 2 is a circuit diagram of an embodiment of the over-voltage protection system 20 as disclosed. In one embodiment, the first switch unit 212 of the first over-voltage protection circuit 210 includes a P-channel metal oxide semiconductor field effect transistor (PMOSFET) Q1, and the PMOSFET Q1 includes a gate connected to the first detection unit 211, a source connected to the power supply 50, and a drain connected to the first working circuit 30. The first detection unit 211 includes a first resistor R1, a second resistor R2, and a first comparator 2110. The first resistor R1 and the second resistor R2 are connected in series between the power supply 50 and the ground. The first comparator 2110 includes a positive input, a negative input and an output, the positive input is connected between the first resistor R1 and the second resistor R2, the negative input is connected to a reference voltage 60, and the output is connected to the first switch unit 212, that is, to the gate of the PMOSFET Q1. The reference voltage 60 may be about 2.5V. Tolerance to the reference voltage 60 may occur due to dispersion of parameters of electronic components. For example, the reference voltage 60 may range from about 2.453V to 2.573V.

In one embodiment, the second switch unit 222 of the second over-voltage protection circuit 220 includes a PMOSFET Q2 including a gate connected to the second detection unit 221, a source connected to the drain of the PMOSFET Q1, and a drain connected to the second working circuit 40. The second detection unit 221 includes a third resistor R3, a fourth resistor R4 and a second comparator 2210. The third resistor R3 and the fourth resistor R4 are connected in series between the drain of the PMOSFET Q1 and the ground. The second comparator 2210 includes a positive input, a negative input and an output, the positive input is connected between the third resistor R3 and the fourth resistor R4, the negative input is connected to the reference voltage 60, and the output is connected to the second switch unit 222, that is, to the gate of the PMOSFET Q2. In one embodiment, the first resistor R1 and the third resistor R3 have the same resistance, for example, both about 100K ohm. The second resistor R2 has lower resistance than that of the fourth resistor R4, for example, about 22.4K ohm and about 24.3K ohm, respectively.

In one embodiment, the output and the positive input of the first comparator 2110 connect to a fifth resistor R5, and the output and the positive input of the second comparator 2210 connect to a sixth resistor R6, both for feedback. A seventh resistor R7 is connected between the source and the gate of the PMOSFET Q1, and an eighth resistor R8 is connected between the source and the gate of the PMOSFET Q2. The over-voltage protection system 20 further includes a capacitor C1 connected to the second resistor R2 in parallel.

The voltage load circuit 230 includes a first transistor Q3, a second transistor Q4 and a third transistor Q5. The first transistor Q3 includes a base and a collector connected together and to the drain of the PMOSFET Q1 and an emitter connected to the second working circuit 40 through a ninth resistor R9. The second transistor Q4 includes a base connected to the emitter of the first transistor Q1, a collector connected to the drain of the PMOSFET Q1 through a tenth resistor R10, and an emitter connected to the second working circuit 40. The third transistor Q5 includes a base connected to the collector of the second transistor Q4, an emitter connected to the drain of the PMOSFET Q1, and a collector connected to the second working circuit 40. In one embodiment, the first transistor Q3 and the second transistor Q4 bear partial voltage of the power supply 50, and the third transistor Q5 provides current to the second working circuit 40.

If the voltage of the power supply 50 exceeds the first predetermined voltage value, for example, about 14.1V, voltage at the second resistor R2 exceeds 2.5V. That is, voltage at the positive input of the first comparator 2110 exceeds 2.5V, higher than that at the negative input. Thus, the first comparator 2110 outputs a high logic level signal, for example, a voltage signal of about 14.1V, to the gate of the PMOSFET Q1 to turn off the PMOSFET Q1, and no voltage is input to the first working circuit 30 and the second working circuit 40. That is, the first over-voltage protection circuit 210 is triggered to protect both the first working circuit 30 and the second working circuit 40. In one embodiment, the high logic level signal output by the first comparator 2110 has a voltage value equal to that of the power supply 50.

If the voltage of the power supply 50 exceeds the second predetermined voltage value and is lower than the first predetermined voltage value, for example, exceeding 13.2V and being lower than 14.1V, the voltage at the second resistor R2 is lower than 2.5V. That is, voltage at the positive input of the first comparator 2110 is lower than 2.5V, lower than that on the negative input. Thus, the first comparator 2110 outputs a low logic level signal, for example, a voltage signal of about 0V, to the gate of the PMOSFET Q1 to turn on the PMOSFET Q1, and the power supply 50 provides power to the first working circuit 30 to retain normal operation. Ignoring drop voltage of the PMOSFET Q1, voltage at the fourth resistor R4 exceeds 2.5V, that is, voltage at the positive input of the second comparator 2210 exceeds 2.5V, exceeding that at the negative input. Thus, the second comparator 2210 outputs a high logic level signal to the gate of the PMOSFET Q2 to turn off the PMOSFET Q2 to protect the second working circuit 40, and the power supply 50 does not directly provide power to the second working circuit 40. The three transistors Q3~Q5 of the voltage load circuit 230 turn on, and the first transistor Q3 and the second transistor Q4 bear partial voltage of the power supply 50 to provide necessary power to the second working circuit 40. At this time, the first over-voltage protection circuit 210 is not triggered, and the second over-voltage protection circuit 220 is triggered to protect the second working circuit 40.

If the voltage of the power supply 50 is lower than the second predetermined voltage value, for example, about 13.2V, neither the first over-voltage protection circuit 210 or the second over-voltage protection circuit 220 are triggered, and both the first working circuit 30 and the second working circuit 40 function normally. The voltage at the second resistor R2 is lower than 2.5V. That is, voltage at the positive input of the first comparator 2110 is lower than 2.5V, lower than that at the negative input. Thus, the first comparator 2110 outputs a low logic level signal to the gate of the PMOSFET Q1 to turn on the PMOSFET Q1, and the power supply 50 provides power to the first working circuit 30 for normal operation. Ignoring drop voltage of the PMOSFET Q1, voltage at the fourth resistor R4 is lower than 2.5V, that is, voltage at the positive input of the second comparator 2210 is lower than 2.5V, lower than that at the negative input. Thus, the second comparator 2210 outputs a low logic level signal to the gate of the PMOSFET Q2 to turn on the PMOSFET Q2. Because drop voltage of the PMOSFET Q2 is low, and the three transistors Q3~Q5 are turned off, the power supply 50 provides power directly to the second working circuit 40.

The electronic device 10 and the over-voltage protection system 20 include two over-voltage protection circuits with different trigger values, and provides different protection related to different inputs, for improved protection. In addition, the over-voltage protection system 20 utilizes comparators and the transistors to detect and protect, which decreases costs and is easy to implement.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. An over-voltage protection system, comprising:
    a first over-voltage protection circuit, connected between a power supply and a first working circuit of an electronic device, and comprising:
       a first switch unit connected between the power supply and the first working circuit; and
       a first detection unit, operable to detect voltage of the power supply and to turn off the first switch unit to isolate the power supply from the first working circuit when the voltage of the power supply exceeds a first predetermined voltage value;

a second over-voltage protection circuit, connected between the first over-voltage protection circuit and a second working circuit of the electronic device, and comprising:
  a second switch unit, connected between the first over-voltage protection circuit and the second working circuit; and
  a second detection unit, operable to detect the voltage of the power supply and to turn off the second switch unit to isolate the power supply from the second working circuit when the voltage of the power supply exceeds a second predetermined voltage value and is lower than the first predetermined voltage value; and
  a voltage load circuit, connected to the second over-voltage protection circuit in parallel, operable to bear partial voltage of the power supply to provide necessary power to the second working circuit when the second switch unit turns off.

2. The over-voltage protection system of claim 1, wherein the first switch unit comprises a P-channel metal oxide semiconductor field effect transistor comprising a gate connected to the first detection unit, a source connected to the power supply, and a drain connected to the first working circuit.

3. The over-voltage protection system of claim 1, wherein the first detection unit comprises:
  a first resistor;
  a second resistor, wherein the first resistor and the second resistor are connected in series between the power supply and the ground; and
  a first comparator comprising a positive input, a negative input and an output, wherein the positive input is connected between the first resistor and the second resistor, the negative input is connected to a reference voltage, and the output is connected to the first switch unit.

4. The over-voltage protection system of claim 1, wherein the second switch unit comprises a P-channel metal oxide semiconductor field effect transistor comprising a gate connected to the second detection unit, a source connected to the first switch unit, and a drain connected to the second working circuit.

5. The over-voltage protection system of claim 1, wherein the second detection unit comprises:
  a third resistor;
  a fourth resistor, wherein the third resistor and the fourth resistor are connected in series between the first switch unit and the ground; and
  a second comparator comprising a positive input, a negative input and an output, wherein the positive input is connected between the third resistor and the fourth resistor, the negative input is connected to a reference voltage, and the output is connected to the second switch unit.

6. The over-voltage protection system of claim 1, wherein the voltage load circuit comprises:
  a first transistor, comprising a base and a collector connected together and to the first switch unit and an emitter connected to the second working circuit;
  a second transistor, comprising a base connected to the emitter of the first transistor, a collector connected to the first switch unit, and an emitter connected to the second working circuit; and
  a third transistor, comprising a base connected to the collector of the second transistor, an emitter connected to the first switch unit, and a collector connected to the second working circuit.

7. An electronic device, comprising:
  at least two working circuits comprising a first working circuit and a second working circuit; and
  an over-voltage protection system, comprising:
    a first over-voltage protection circuit, connected between a power supply and the first working circuit, and comprising:
      a first switch unit connected between the power supply and the first working circuit; and
      a first detection unit, operable to detect voltage of the power supply and to turn off the first switch unit to isolate the power supply from the first working circuit when voltage of the power supply exceeds a first predetermined voltage value;
    a second over-voltage protection circuit, connected between the first over-voltage protection circuit and the second working circuit, and comprising:
      a second switch unit, connected between the first over-voltage protection circuit and the second working circuit; and
      a second detection unit, operable to detect the voltage of the power supply and to turn off the second switch unit to isolate the power supply from the second working circuit when the voltage of the power supply exceeds a second predetermined voltage value and is lower than the first predetermined voltage value; and
    a voltage load circuit, connected to the second over-voltage protection circuit in parallel, operable to bear partial voltage of the power supply to provide necessary power to the second working circuit when the second switch unit turns off.

8. The electronic device of claim 7, wherein the first switch unit comprises a P-channel metal oxide semiconductor field effect transistor comprising a gate connected to the first detection unit, a source connected to the power supply, and a drain connected to the first working circuit.

9. The electronic device of claim 7, wherein the first detection unit comprises:
  a first resistor;
  a second resistor, wherein the first resistor and the second resistor are connected in series between the power supply and the ground; and
  a first comparator comprising a positive input, a negative input and an output, wherein the positive input is connected between the first resistor and the second resistor, the negative input is connected to a reference voltage, and the output is connected to the first switch unit.

10. The electronic device of claim 7, wherein the second switch unit comprises a P-channel metal oxide semiconductor field effect transistor comprising a gate connected to the second detection unit, a source connected to the first switch unit, and a drain connected to the second working circuit.

11. The electronic device of claim 7, wherein the second detection unit comprises:
  a third resistor;
  a fourth resistor, wherein the third resistor and the fourth resistor are connected in series between the first switch unit and the ground; and
  a second comparator comprising a positive input, a negative input and an output, wherein the positive input is connected between the third resistor and the fourth resistor, the negative input is connected to a reference voltage, and the output is connected to the second switch unit.

12. The electronic device of claim 7, wherein the voltage load circuit comprises:
- a first transistor, comprising a base and a collector connected together and to the first switch unit and an emitter connected to the second working circuit;
- a second transistor, comprising a base connected to the emitter of the first transistor, a collector connected to the first switch unit, and an emitter connected to the second working circuit; and
- a third transistor, comprising a base connected to the collector of the second transistor, an emitter connected to the first switch unit, and a collector connected to the second working circuit.

* * * * *